United States Patent [19]
Argentieri et al.

[11] 3,831,451
[45] Aug. 27, 1974

[54] MEANS FOR AVOIDING STATIC FRICTION

[75] Inventors: Michael Argentieri, West Orange; John H. Andresen, Jr., Hewitt, both of N.J.

[73] Assignee: Intercontinental Dynamics Corporation, Englewood, N.J.

[22] Filed: Jan. 26, 1973

[21] Appl. No.: 326,999

[52] U.S. Cl. .................................. 73/387, 318/431
[51] Int. Cl. .............................................. G01i 7/14
[58] Field of Search ......... 73/386, 387, 384, 432 A, 73/496; 318/431; 324/125, 154 R

[56] References Cited
UNITED STATES PATENTS

| | | | |
|---|---|---|---|
| 1,638,102 | 8/1927 | Roucka | 73/205 R |
| 1,791,246 | 2/1931 | Paulin | 73/432 A |
| 2,827,610 | 3/1958 | Hiser | 324/125 |

*Primary Examiner*—Donald O. Woodiel
*Attorney, Agent, or Firm*—Ostrolenk, Faber, Gerb & Soffen

[57] ABSTRACT

A pressure driven altimeter is provided with an A.C. torquer to impart low amplitude torsional oscillations to a drive shaft of the gear train between the aneroid mechanism and the output pointer. These shaft oscillations are coaxial with the direction in which this shaft is pivoted by a pressure-altitude sensing aneroid mechanism. These torsional vibrations serve to prevent buildup of static friction forces and overcome other friction forces that will interfere with altimeter accuracy and resolution.

6 Claims, 2 Drawing Figures

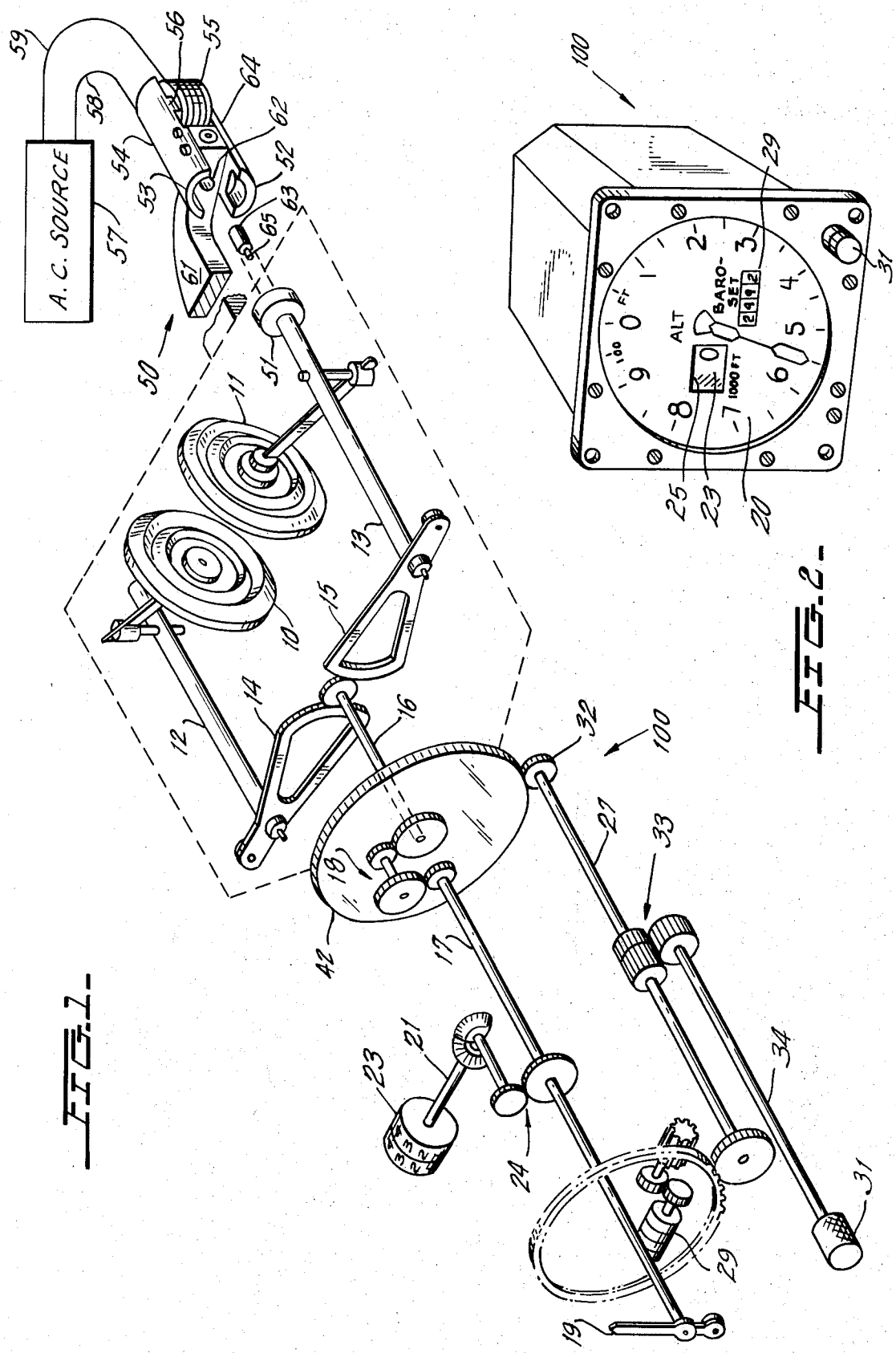

MEANS FOR AVOIDING STATIC FRICTION

This invention relates to measuring indicator devices driven by low power sensors and more particularly relates to a novel anti-friction means for this type of device.

In pressure driven altimeters and other indicators and transducers driven directly by pressure sensing diaphragm capsules or bellows, friction, including static forces in gear trains, calibrating linkages and electrical motion-to-signal transducing elements, often limits accuracy and resolution. To minimize build-up of static friction, the prior art has relied upon ambient vibrations of the vehicle or equipment in which the pressure driven device is mounted, has provided means to vibrate the entire instrument or entire instrument panel, as by using a rotating eccentric vibrator or a "thumper" driven electrically.

As will hereinafter be seen, the instant invention prevents buildup of static friction by utilizing a torquer acting directly on a shaft in the drive system between the parameter sensor and the output display, to provide a low amplitude torsional vibration on such shaft. The torquer acts in a controlled manner to almost completely remove adverse effects of friction and backlash from the instrument. Operation of this torquer does not result in generating perceptable noise or wear as do currently available vibrators and thumpers.

Accordingly, a primary object of the instant invention is to provide a novel anti-friction means for a low powered indicating instrument.

Another object is to provide anti-friction means of this type which imparts a controlled torsional vibration to a shaft driven by a sensor parallel to the torsional vibration.

Still another object is to provide anti-friction means of this type that does not produce perceptable noise or wear.

A further object is to utilize a relatively low frequency torquer to produce low amplitude torsional vibrations on a drive system shaft to substantially eliminate adverse friction effects.

These and other objects of this invention will become apparent from the following description when taken in connection with the drawings in which:

FIG. 1 is a perspective diagram of a standard type of altimeter which is modified in accordance with the present invention.

FIG. 2 shows the instrument of FIG. 1 contained within a housing.

Referring to the Figures, altimeter 100 includes a conventional type of dual aneroid pressure altitude sensing means formed by diaphragms 10 and 11 which expand and contract responsive to predetermined pressures applied thereto. The output of diaphragms 10 and 11 is caused to rotate shafts 12 and 13, respectively, which are fixed to gear sectors 14 and 15, respectively. Gear sectors 14 and 15 drive shaft 16. The latter is connected to shaft 17 through the gear train 18. Shaft 17 is then directly connected to pointer 19 which sweeps across the instrument face 20 as shown in FIG. 2.

More specifically, one complete rotation of pointer 19 may correspond to an altitude change of 1,000 feet. Shaft 17 is also connected to shaft 21 of the altitude drum type counter 23 through gear train 24 where the drum which is visible through window 25 of FIG. 2 indicates feet in increments of 1,000. In order to preset the instrument for predetermined barometric conditions, knob 31 is turned. This rotates shaft 34 connected through gearing 33 to rotate countershaft 27 having gear 32 keyed thereto. The teeth of gear 32 are in mesh with gear teeth on plate 42 to rotate gearing, the whole aneroid mechanism, which is attached to plate 42, and the barometric counter 29.

In accordance with the instant invention, the conventional pressure responsive altimeter described to this point is provided with an A.C. driven motor or torquer 50 constituting an antifriction means. Torquer 50 includes permanent magnet rotor 51 fixed to shaft 13 at the end thereof remote from gear sector 15. Rotor 51 is positioned between pole piece portions 52, 53 of magnetic frame 54. Coil 55 is wound on leg 56 of frame 54 and is electrically connected to A.C. source 57 by leads 58, 59.

Magnetic frame 54 mounted to support arm 61 is secured to plate 42 so as to be movable with the aneroid mechanism as knob 31 is operated. Arm 61 includes locating aperture 62 which receives bearing support 63 that is fixed in position by set screw 64. Bearing pivot 65 carried by support 63 is received by a jewelled bearing (not shown) in the end of arm 13 remote from gear section 15.

When coil 55 is energized by A.C. source 57, the alternating magnetic field generated in magnetic frame 54 causes rotor 51 to oscillate at a frequency preferably in the range of 8 to 30 c.p.s., thereby oscillating shaft 13 about its longitudinal or rotational axis. These torsional oscillations are of low amplitude and impart low amplitude oscillations through the entire drive system to pointer 19 to overcome static friction forces that would interfere with the ability of the instrument to accurately respond to the low power drive forces generated by pressure changes acting on the aneroid mechanism.

It has been found that for a practical altimeter structure A.C. source 57 operated at about 10 c.p.s. This relatively low oscillation frequency provides sufficient dwell time for the gear train elements to react favorably and this low frequency provides time for pulsed forces to impart low amplitude oscillation to all elements of this gear train. The frequency use for a particular instrument is to a great extent determined by the inertia of the moving elements and the spring rate of the driving capsules and any other springs in the system. The amplitude used is that which just barely moves the output elements in an oscillatory fashion without producing undesirable oscillation in the visual or electrical outputs.

Although there have been described preferred embodiments of this novel invention, many variations and modifications will now become apparent to those skilled in the art. Therefore, this invention is to be limited not by the specific disclosure herein, but only by the appending claims.

The embodiments of the invention in which an exclusive privilege or property is claimed are defined as follows:

1. An instrument for indicating a measured parameter including, a movable indicator, parameter sensing means, mechanical drive means interconnecting said sensing means and said indicator whereby the latter is drivable by the former, said mechanical drive means including a drive shaft mounted for movement about a rotational axis responsive to actuation by said sensing means, and vibrator means having an element mounted to said drive shaft for imparting relatively low amplitude oscillations which torque said drive shaft with respect to its rotational axis as a center, said sensing means including at least one drive unit responsive to atmospheric pressure.

2. An instrument as set forth in claim 1 in which there are a plurality of units and there is an individual drive shaft for each of the units; all of said drive shafts being moved so as to transmit forces acting to move said indicator in the same direction, said element of said vibrator means being mounted on and keyed directly to only one of said drive shafts.

3. An instrument as set forth in claim 1 in which the vibrator means includes a motor, said element being a permanent magnet armature of said motor.

4. An instrument as set forth in claim 1 in which the vibrator means includes an A.C. source of approximately 10 c.p.s.

5. An instrument as set forth in claim 4 in which there are a plurality of units and there is an individual drive shaft for each of the units; all of said drive shafts being moved so as to transmit forces acting to move said indicator in the same direction, said element of said vibrator means being mounted on and keyed directly to only one of said drive shafts.

6. An instrument as set forth in claim 5 in which the vibrator means ncludes a motor, said element being a permanent magnet armature of said motor.

* * * * *